Feb. 5, 1946.   J. A. TOLMAN   2,394,411
DYNAMIC BALANCING MACHINE
Filed April 24, 1943   4 Sheets-Sheet 1

INVENTOR
John A. Tolman.
BY Harness, Dickey & Pierce.
ATTORNEYS.

Feb. 5, 1946.　　　　J. A. TOLMAN　　　　2,394,411
DYNAMIC BALANCING MACHINE
Filed April 24, 1943　　　　4 Sheets-Sheet 2
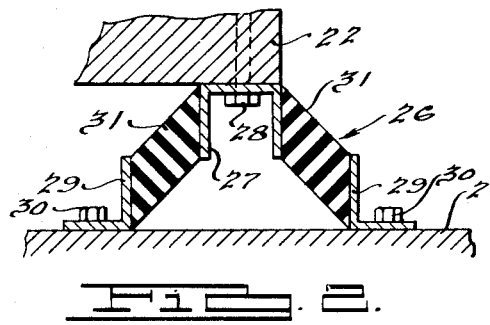
FIG. 2.
FIG. 3.
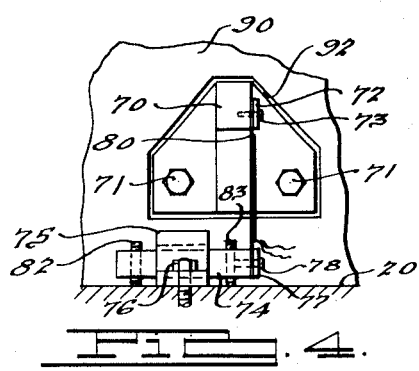
FIG. 4.
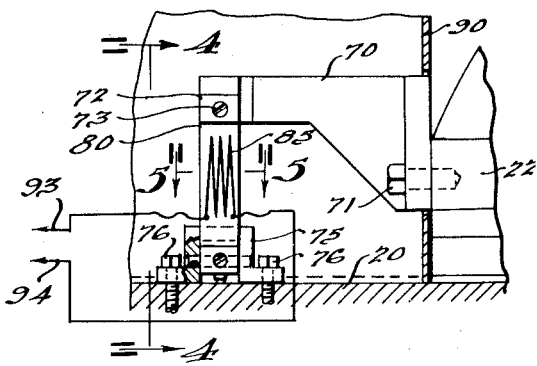
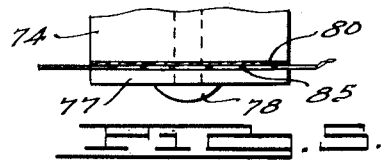
FIG. 5.
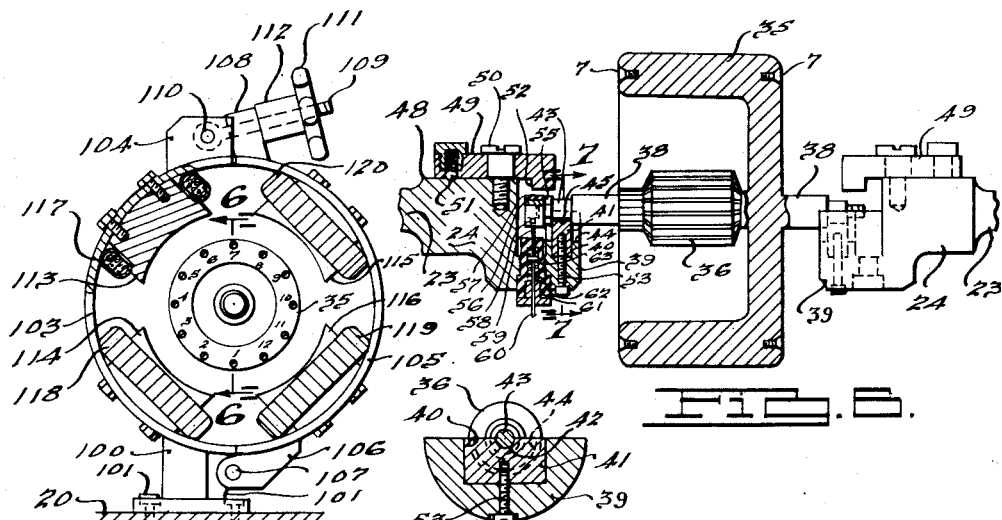
FIG. 8.　　FIG. 7.
INVENTOR
John A. Tolman.
BY Harness, Dickey & Pierce
ATTORNEYS.

Feb. 5, 1946.    J. A. TOLMAN    2,394,411
DYNAMIC BALANCING MACHINE
Filed April 24, 1943    4 Sheets-Sheet 3
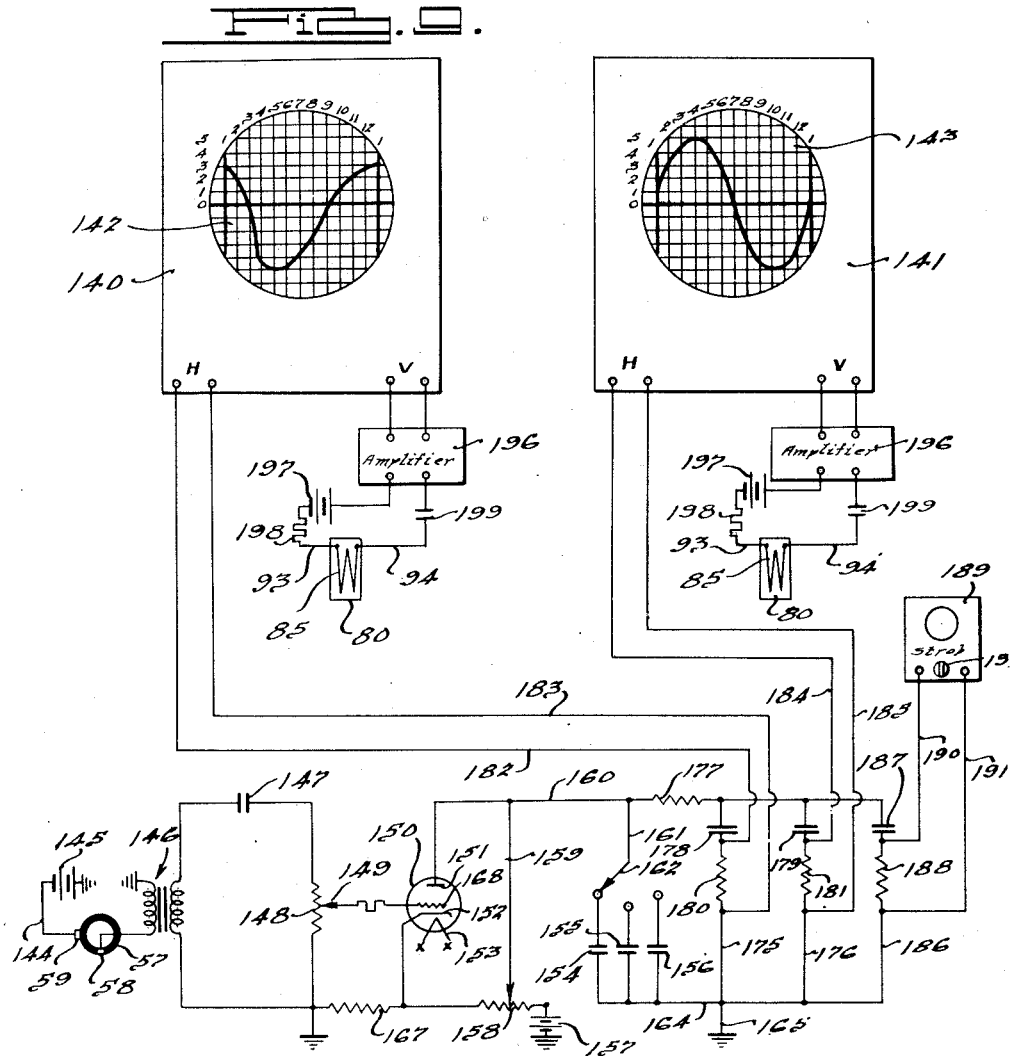
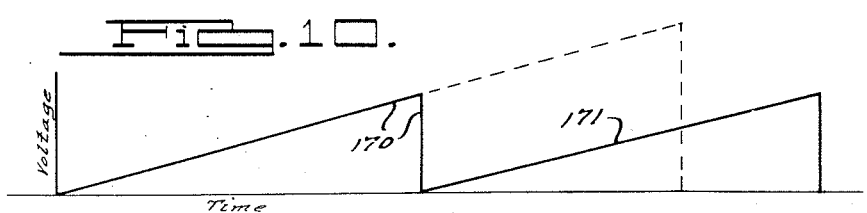
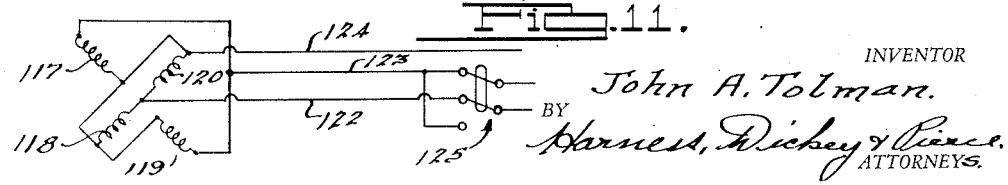
INVENTOR
John A. Tolman.
BY
Harness, Dickey & Pierce.
ATTORNEYS.

INVENTOR
John A. Tolman.
BY
Harness, Dickey & Pierce.
ATTORNEYS.

Patented Feb. 5, 1946

2,394,411

UNITED STATES PATENT OFFICE 2,394,411

DYNAMIC BALANCING MACHINE

John A. Tolman, Detroit, Mich., assignor to Frank T. Bromley, Detroit, Mich.

Application April 24, 1943, Serial No. 484,404

2 Claims. (Cl. 73—66)

The present invention relates to a dynamic balancing machine particularly adapted for mass production balancing of bodies, such as gyroscopic rotors, which rotate at very high speeds and which, consequently, must be balanced with great accuracy.

It is the general object of the present invention to provide a dynamic balancing machine with which high speed rotors may be quickly and easily balanced to a high degree of accuracy.

It has long been known that any unbalanced rotating body may be balanced by adding or removing weights in any two axially spaced correction planes extending transversely to the axis of the rotor. It has, accordingly, long been the practice to employ balancing machines incorporating means for locating the angular position of out-of-balance and the amount of out-of-balance in each of two such correction planes. This is customarily done by mounting the rotor in movable bearings and measuring the amplitude of vibration in each of two selected planes extending at right angles to the axis of the rotor. However, inasmuch as an out-of-balance condition at one of the two correction planes has an effect upon the vibration in the other correction plane, the amplitude of vibration at neither correction plane indicates the amount of weight which must be added or removed in that plane to correct the out-of-balance condition. To overcome this difficulty, several expedients have been suggested. One such expedient is to fix the rotor against movement in one correction plane, leaving it free to vibrate in the other. This method, however, is not suitable for very high speed rotors where great accuracy of balancing is necessary. Another expedient is to employ electrical pickups to measure the vibration in the two planes and to mix a predetermined arbitrary portion of the impulse received from one pickup with the electrical output from the pickup associated with the other correction plane, in an attempt to compensate for the effect in the latter plane of the out-of-balance existing in the first plane. This expedient is not satisfactory: first, because it is based upon the erroneous assumption that the vibration in one correction plane, which is due to out-of-balance in the other correction plane, is a fixed proportion of the vibration in the other plane for all rotors of a given kind; and, secondly, because that expedient requires the use of a switching mechanism to switch the connections between the measuring circuits and the electrical pickups to one position for reading the vibrations at one plane, and then to another position for reading the vibrations at the second plane.

It has been found that the effect of out-of-balance in one correction plane upon the vibrations in the other correction plane may be ignored and accurate results achieved in less time with a machine which gives a simultaneous reading of the amplitude of vibration and the angular location of the out-of-balance at both ends of the rotor, provided each successive correction is made in the correction plane showing the greatest amplitude of vibration.

An object of the present invention is to provide a balancing machine in which the rotor is free to vibrate in all directions and an improved electrical pickup for measuring the amplitude of vibration of the rotor in a single direction parallel to the correction planes.

Other objects of the invention will become apparent from the following specification, the drawings relating thereto, and from the claims hereinafter set forth.

In the drawings, in which like numerals are used to designate like parts in the several views throughout:

Figure 2 is a fragmentary section taken on the line 2—2 of Figure 1;

Figure 3 is a fragmentary side elevation of the electrical pickup taken on the line 3—3 of Figure 1, with the front wall of the casing removed;

Figure 4 is an end elevation taken on the line 4—4 of Figure 3;

Figure 5 is a fragmentary horizontal section taken on the line 5—5 of Figure 3;

Figure 6 is a longitudinal section through the rotor, showing its supporting bearings;

Figure 7 is a fragmentary section taken on the line 7—7 of Figure 6, showing the construction of the bearing support for the rotor;

Figure 8 is an end view of the rotor and rotor driving means taken on the line 8—8 of Figure 1;

Figure 9 is a wiring diagram for the cathode ray oscilloscopes employed to indicate the amount and location of out-of-balance;

Figure 10 is a diagrammatic illustration of the type of saw tooth wave impressed upon the horizontal plates of the oscilloscopes;

Figure 11 is a wiring diagram for the means for driving and braking the rotor;

Figure 1:
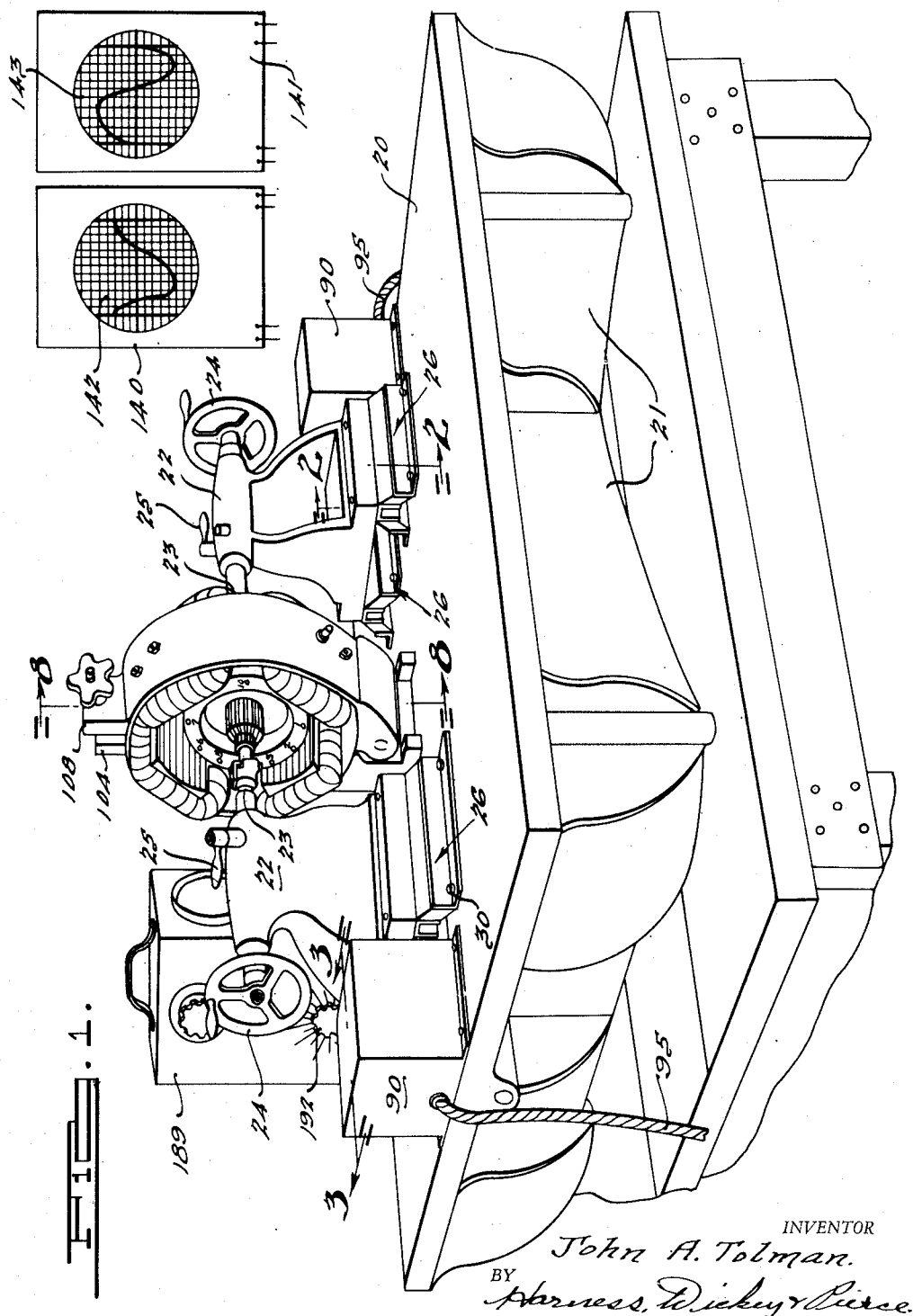
Figure 1 is a general perspective view of the major mechanical portions of the machine.

Referring to the drawings, and particularly to Figure 1 thereof, the machine in general comprises a heavy, rigid, cast iron base 20, of any desired rigid construction. Its rigidity is greatly enhanced by the webbing 21 on its undersurface. Resiliently mounted upon the base 20 is a pair of conventional lathe tail stocks 22 provided with aligned spindles 23 facing toward each other. The spindles are adjustable toward and away from each other by means of hand wheels 24, and are locked in position by means of a clamping handle 25 in the usual manner.

The tail stocks are each supported by a pair of composite rubber and metal channel structures, indicated generally at 26. As best shown in Figure 2, the channel structures 26 comprise a U-shaped metal channel member 27, secured by means of cap screws or bolts 28 to the underside of the base of the tail stocks, and a pair of angle members 29, positioned below and at either side of the channel 27 and secured by studs 30 to the base 20. Longitudinally extending blocks of rubber 31 are bonded to the outer surfaces of the channel member 27 and the inner surfaces of the adjacent vertical legs of the angle irons 29. As a result of this arrangement, the tail stocks have freedom to oscillate to a limited degree relative to the base in all directions.

The tail stocks, themselves, are relatively rigid and heavy and, consequently, do not have a period of vibration within the frequency range of the rotor to be balanced; and the weight of the tail stocks, as compared with the relative non-rigidity of the rubber mounting, results in an assembly whose natural period of vibration is far below the frequency of vibration of the rotor to be tested. Consequently, the tail stocks are free to vibrate to a limited degree in response to the vibrations of the rotor and accurately reflect the degree of rotor unbalance. The mounting employed, together with the heavy base, also isolates the vibrations at one end of the rotor from those at the other.

The particular form of rubber mounting illustrated and described is a conventional form of resilient mounting device, and it will be appreciated that any other form of resilient mounting for the tail stocks may be employed.

As best shown in Figures 6 and 7, the spindles 23 are provided with bearing units for supporting a rotor to be balanced. The particular form of rotor chosen for purposes of illustration is a gyroscope rotor 35, which is of generally cupped form and is provided with an internal armature 36 which, in the assembled gyroscope, co-operates with a stationary field winding to drive the rotor. The rotor 35 is provided with a pair of relatively slender projecting shafts 38, on which it is supported in the assembled gyroscope. At each face of the rotor, twelve small tapped openings are provided to receive an equal number of small screws, numbered 1 to 12, respectively, and shown best in Figures 1, 6 and 8. These identifying numbers are stamped or otherwise marked on the rotor adjacent each screw, and the screws at one end of the rotor are located in the same angular position as the correspondingly numbered screws at the opposite end of the rotor. The rotor is balanced by removing one or more of these screws and replacing them by shorter or longer screws. It will be understood, however, that the screws may be dispensed with and the rotor balanced by removing metal at the proper points by drilling holes.

The spindles 23 are enlarged to form a block-shaped bearing element 24 having a forward projection 39 located below the axis of the rotor. This projection, as best shown in Figures 6 and 7, is provided with a vertical slot 40 in which is seated a bronze bearing block 41 having a semi-cylindrical bearing recess 42 to receive the reduced journal portion 43 of the shaft 38. The projection 39 is cut away at 44, as best shown by the dotted lines in Figure 7, in order to clear the shaft. An oil groove 45 extends around the bearing surface of the bearing element 41.

The top of the spindle enlargement 24 is machined off flat at 48 to form a seat for a retainer element 49, which is pivotally secured to the enlargement 24 by means of a shouldered stud 50. A spring pressed ball 51 mounted in the retainer element 49 is adapted to engage in a recess in the upper surface of the enlargement 24 to resiliently retain the retaining element in the position shown in Figure 6, in which position a forwardly and downwardly projecting nose 52 overlies the end of the shaft 38. While the end 52 of the retainer is out of contact with the shaft, it is positioned sufficiently close to the shaft to prevent it from jumping out of the half bearing element 41. The bearing element, in turn, is held in position by means of a stud 53, which is threaded into a tapped opening in the lower portion of the bearing element 41. The use of a half bearing facilitates installing and removing the rotor from the machine, and has been found to give excellent results in balancing gyroscope rotors. However, a full bearing or any other type of bearing support may be employed, if desired.

The bearing supports for the two spindles 23, so far described, are identical. However, there is provided in connection with one of the bearing supports a commutator adapted to make an electrical contact with the shaft once each revolution. This means, as best shown in Figure 6, comprises a nut 55 threaded on the reduced threaded extremity of the shaft 38. This nut is provided with a hex portion at its inner end, which seats against the shoulder at the extremity of the journal portion 43 of the shaft, and also a cylindrical portion 56, upon which is pressed a sleeve 57 of hard rubber, Bakelite, or other insulating material. The sleeve 57 carries a contact point 58, which makes electrical contact with the cylindrical portion 56 of the nut and is adapted once each revolution to engage a contact point 59 on the end of a rod 60. The rod 60, in turn, is carried by a plug-shaped housing 61, formed of insulating material, which is threaded into a tapped opening in the underside of the enlarged projection 39 on the spindle. The plug-shaped housing 61 contains a spring 62, which engages an enlargement 63 on the rod 60 and thus urges the rod and, consequently, the contact 59 upwardly into engagement with the sleeve 57.

After the nut 55 is secured to one end of the shaft 38, the sleeve 57 may be rotated until the contact 58 lies in the same angular position relative to the axis of the rotor as one of the twelve balancing screws. It has a sufficiently close fit so that it will be maintained by friction in adjusted position. As shown in the drawings, the contact is in the same angular position as the balancing screw numbered 1. As a result of this arrangement, every time the Number 1 position on the rotor passes the lowermost point, as shown in Figure 8, an electrical contact will be made between the contacts 58 and 59. At all other times, the rod 60 will be insulated from the machine. The resulting electrical impulse, as hereinafter set forth, is employed to synchronize the electrical impulse generated by the vibrations of the rotor with the speed of rotation of the rotor on the oscilloscope screens.

The electrical pickup for responding to the vibrations of the tail stocks 22 as illustrated in Figures 3 to 5, inclusive. As there shown, the base of each tail stock carries a horizontally projecting bracket 70 secured in position by means of studs 71. The extremity of the bracket is provided with a clamping element 72 held in position by means of a screw 73. Immediately below the extremity of bracket 70 there is provided a horizontal bar 74, which is longitudinally slidable in a U-shaped bracket 75 secured to the base 20 of the machine by means of studs 76. The horizontal bar 74 may thus be adjusted longitudinally until one extremity lies directly beneath the clamping face of the projecting end of arm 70, as best shown in Figure 4, and that end of the horizontal bar is provided with a clamping element 77 similar to the clamping element 72 and secured in position by means of a screw 78. The electrical pickup, which is in the form of a flexible strip 80, is clamped at its ends by the clamping elements 72 and 77 and is stretched slightly by means of a pair of set screws 82 and 83, which are threaded through the bar 74 and engage the base 20 of the machine. The two set screws 82 and 83 hold the bar 74 against the underside of the U-shaped bracket 75 and, by manipulating one or both of the screws 82 and 83, the tension or stretched condition of the flexible strip 80 may be adjusted. Thus, by threading screw 82 downwardly through the bar 74 and screw 83 upwardly, the tension may be increased, and vice versa.

The flexible strip, which may be of any suitable material, such as a high grade vellum paper, carries a fine resistance wire 85, which is secured to the strip by means of an adhesive, such as "Duco" lacquer, and extends longitudinally of the strip. In order to increase the effective length of the wire 85, several longitudinal courses are provided in zig-zag form, as shown best in Figure 3. The arrangement is such that when strip 80 is stretched, the resistance wire 85, by reason of its adhesion to the strip, will be correspondingly stretched. This stretching or straining of the wire varies its electrical resistance and, consequently, gives a measure of the amplitude of vibration of the tail stock 22.

The wire 85 is preferably a fine, temperature corrected, resistance wire, such as is used in high grade calibrated resistance units. A wire whose diameter is .008 inch has been found suitable. When the wire is connected to a suitable source of electric potential, the voltage drop through the wire gives a very accurate indication of the amount of stretch. The unit has a straight line coefficient and is not appreciably affected by variations in temperature or humidity.

An important advantage of this form of pickup resides in the fact that it automatically isolates and measures only the displacement of the tail stock in the plane of the strip, in spite of the fact that during the balancing operation the tail stock and, consequently, the end of the lever 70 is vibrating in a more or less circular path. Displacements of the extremity of lever 70 in a direction at right angles to the plane of the strip 80 will not affect the resistance of the wire because the displacement is negligible compared with the length of the strip, itself. It will be understood, therefore, that the strip must be of a length sufficiently in excess of the amplitude of vibration, so that it remains stretched at all times and the displacements at right angles to the strip will not change its length to any appreciable extent. In the particular machine illustrated and described, the maximum displacements at the end of the lever 70 are in the order of .005 of an inch. Consequently, a strip two inches long will not be measurably affected by such displacements at right angles thereto.

It will be understood that a pickup arrangement, of the type just described, is provided for each of the tail stocks 22. In order to protect them, they are enclosed in suitable housings 90, as shown in Figure 1, the inner wall of the housing being cut away at 92, as best shown in Figure 4, to permit the lever 70 to project into the housing without contacting the walls of the housing. A pair of electrical wires 93 and 94 are connected to the opposite ends of the wire 85 and are carried from the housings 90 in cables 95. These wires, as hereinafter set forth, carry the electrical impulses through suitable means to the devices for recording the amplitude of vibration.

It will be noted that the pickups are located at some distance from the ends of the rotor, instead of in the correction plane, as is the usual practice. This location is advantageous because it is out of the way and it is made possible because of the fact that the tail stocks are relatively rigid and hence each vibrates more or less as a unit. A further advantage of this pickup arrangement is that the lever 70, in effect, amplifies the minute oscillations of the tail stocks without distortion.

An important feature of the machine resides in the means for driving the rotor in order to bring it up to balancing speed. In this connection, it will be noted that while the particular rotor chosen for illustration carries an armature from which it could be driven by means of the field winding with which it will be associated in the completed gyroscope, nevertheless, it is impractical to drive the rotor in that manner because the weight of the rotor, as compared with the power of its driving motor, is so great that an excessive period of time is required to bring the rotor up to a suitable balancing speed. Since in mass production balancing of gyroscope rotors the maximum possible output per operator is a matter of great importance, the time required to bring the rotor up to speed by that means would seriously slow up the operation. Moreover, to so drive the rotor would require that it be balanced in its own housing, which is undesirable.

It is also undesirable to rotate the rotor by means of belts or other mechanical connections, as they are awkward to handle and manipulate and, unless removed during the balancing operation, interfere with the free oscillation or vibration of the rotor. Accordingly, there is provided in the present machine a plurality of induction coils surrounding the rotor for inducing a rotating electric field passing through the main body of the rotor, itself. This rotating electric field, as is well known, generates eddy currents in the rotor and will thereby apply a driving torque. By providing powerful stator coils, this driving torque can be made very high, with the result that the rotor can be brought up to desired balancing speed in a few seconds.

As best shown in Figure 8, the means for driving the rotor is mounted upon a bracket 100, which is secured to the base 20 of the machine by means of studs 101. Bracket 100 has welded thereto a semicircular strip of steel 103 to which is welded at its upper end a lug 104. A similar semicircular strip 105 carries at its lower end a bracket 106, which is pivoted on a pin 107 carried by the bracket 100, with the result that the semicircular strip 105 may be swung in a clockwise direction, as viewed in Figure 8, to open the complete circle defined by the strips 103 and 105 and thus make it possible to insert a rotor in the machine or remove it from the machine. At the upper end of the strip 105 is provided a slotted lug 108. An eye-bolt 109 is pivoted on a pin 110 carried by the lug 104 and is adapted to swing into the slot in the upper end of the lug 108. A handle 111 formed on an integrally threaded nut 112 is threaded on the end of the eye-bolt 109 and is adapted to bear against the lug 108 and thus clamp the two semicircular strips 103 and 105 in the position shown in Figure 8. When it is desired to swing the strip 105 out of the way, the hand wheel is loosened and the eye-bolt is swung upward in a counter-clockwise direction about the pin 110, thus freeing the nut 112 from the lug 108.

The semicircular strip 103 has secured thereto a pair of pole pieces 113 and 114, and a similar pair of pole pieces 115 and 116 is secured to the inner sides of the strip 105. The four pole pieces are uniformly spaced around the periphery of the rotor 35, and their inner faces are curved to define portions of a common cylinder. As is well known, the maximum driving efficiency or torque is achieved when the gap between the inner faces of the pole pieces and the rotor is reduced to a minimum. However, in a balancing machine of the type under construction, efficiency of drive is less important than flexibility and, accordingly, the machine is constructed to operate on a range of sizes of rotor. While this means that in certain cases, as illustrated in Figure 8, a large gap will occur between the rotor and the pole faces with consequent loss of efficiency, this loss is of negligible importance. On larger rotors, which require greater driving effort, the gap will be reduced and, consequently, the efficiency and driving torque increased.

Each of the pole pieces is provided with a coil or winding, as indicated at 117, 118, 119 and 120, and these coils or windings may be connected in any conventional manner to a source of alternating current in order to produce a rotating electrical field passing through the rotor. One suitable type of connection is shown in Figure 11, where the four coils 117, 118, 119 and 120 are shown connected in parallel to a two-phase alternating current source through lines 122 and 123 and ground line 124. As will be understood, each pair of diametrically opposed coils will be so wound as to have the same polarity. Lines 122 and 123 contain a pole changer, indicated diagrammatically at 125, for reversing the direction of rotation of the field.

The source of current is preferably a variable frequency source since, by adjusting the frequency, the speed of the rotor may be correspondingly adjusted. For this purpose, any form of alternating current frequency changer may be employed. However, a fixed frequency in excess of that required to perform the balancing operation may be employed, in which case the current to the coils 117—120 is cut off when the rotor reaches the desired speed. In any event, the balance readings should be taken with the power off.

One important advantage of the driving means of the present invention is that as soon as the readings of amount and location of out-of-balance are taken, the polarity of the coils 117 to 120 may be reversed by pole changer 125, in which case the driving means acts as a brake to bring the rotor to a quick stop. This is important because in the absence of some braking means the rotor would coast for an excessive period of time, and it must be stopped in order to change the weights.

The present machine employs a pair of cathode ray oscilloscopes for simultaneously depicting the vibration curve of both ends of the rotor. Since the oscilloscopes, themselves, form no part of the present invention, the detailed construction thereof is not illustrated or described herein, but the oscilloscopes are indicated in the wiring diagram of Figure 9 by the numerals 140 and 141 for the left and right-hand ends of the rotor, respectively. It will be understood that the oscilloscope apparatus includes a cathode ray tube having a screen upon which a stream of electrons is directed from a suitably energized cathode, the screens being indicated in the drawings by the numerals 142 and 143, respectively. Normally the stream of electrons would strike the screen at its center, but there is provided within the tube two pairs of deflecting plates, a horizontal pair on opposite sides of the stream of electrons which, when a voltage is impressed upon them, will deflect the stream and cause it to strike the screen and illuminate the same at a point to one side of the center. The tube also includes a pair of vertical plates for deflecting the stream of electrons above and below the horizontal center line. Also included within the oscilloscopes 140 and 141 are the conventional amplifying and control circuits.

The cathode ray oscilloscopes are employed in the present machine to show on each screen a curve defined by the path of motion of the stream of electrons as it strikes the screen, which represents by its amplitude the amplitude of vibration of the rotor and by its horizontal displacement the angular location of the point of maximum departure from the normal axis of the rotor. Accordingly, the horizontal plates of the cathode ray tubes are energized by a saw-tooth generator operating at the frequency of rotation of the rotor, which generator is illustrated diagrammatically in the lower portion of Figure 9.

Referring to Figure 9, it will be noted that there is illustrated the commutator sleeve 57, together with the contact point 59 and the sleeve contact 58. The contact 59 is connected by means of a line 144 to a source of electrical energy, which may be a battery of dry cells 145, and thence to the primary coil of a transformer 146. The opposite end of the primary coil is connected in any suitable manner to the sleeve contact 58, as by grounding both the dry cell and the primary coil to the left-hand tail stock 22. The circuit of the secondary of the transformer 146 contains a coupling condenser 147 and a rheostat 148, the adjustable tab 149 of which is connected to the grid of a conventional three-element gas-filled tube or valve 150 having a plate 151, a cathode 152 and a filament 153, the latter being energized in any suitable or conventional manner, not shown. As will be understood, the valve is normally non-conducting but becomes conducting when a critical grid-cathode potential is applied if the anode is sufficiently positive with respect to the cathode. Once rendered conductive, it remains so until the anode-cathode potential drops to a critical minimum. The tube 150 is connected in parallel across a charging current for a bank of condensers 154, 155 and 156, of differing capacity. The charging current for the condensers includes the battery 157, rheostat 158, lines 159, 160, 161 and the movable contact 162. The opposite sides of the condensers are connected by means of lines 164 and 165 to ground. The cathode 152 of the tube 150 is also connected to the ground through a resistance 167. This insures a negative grid bias with respect to the cathode except when the grid is subject to a voltage impulse from the secondary of transformer 146.

As a result of this arrangement, the current flowing from the battery 157 through rheostat 158, lines 159, 160 and 161 will charge one or the other of the condensers 155 and 156, depending upon the position of the adjustable contact 162. The circuit is so arranged that when the charge on the condenser 154, for example, approaches its maximum, the potential from the plate to the cathode in the tube 150 will be sufficient to cause a discharge of the condensers through the tube and resistance 167 to ground, thus quickly discharging the condenser even though no voltage is applied to the grid. The condenser will then begin to recharge and the cycle will repeat itself. One cycle of the curve of the resulting voltage across the condenser is depicted in Figure 10 by means of the large triangle, a portion of which is shown in dotted lines, from which it will be seen that it is a saw-tooth wave; that is to say, the voltage across the condenser builds up gradually to a peak and then discharges suddenly through the tube 150. The circuit is so balanced that it will automatically produce a saw-tooth wave having a frequency somewhat less than the frequency at which the rotor is to be balanced. The normal frequency of the circuit may be varied by selecting a condenser of the proper capacity from the bank of condensers 154 to 156.

The circuit containing the secondary of the transformer 146 is employed as a firing circuit for the purpose of producing a saw-tooth wave of exactly the frequency of the rotor to be balanced. Since the secondary of the transformer circuit is subject to a sudden sharp electrical impulse once each revolution of the rotor by means of the commutator ring 157, there will be impressed upon the grid 168 of the tube 150 an instantaneous high voltage at the instant of contact between the contacts 58 and 59 of the commutator. The firing circuit is arranged to produce a firing voltage well in excess of that required to break down the tube 150 and cause an immediate discharge of the condenser 154 at the instant the grid is energized. Since the normal frequency of the saw-tooth wave generated by the tube and condenser circuit is less than the frequency or speed of rotation of the rotor, the result of the firing circuit is to cut off the upper portion of the natural saw-tooth wave, producing a saw-tooth wave of higher frequency, indicated in Figure 10 at 170. As soon as the condenser is fully discharged, the charging circuit will immediately begin to recharge the condenser, thus producing a second identical saw-tooth wave 171, and so on.

In order to insure that the ascending portion of the saw-tooth wave follows a straight line as closely as possible, it is preferred to employ a condenser in the saw-tooth generator which will produce a normal frequency substantially less than the frequency of the rotor, since the upper charging portion of the natural saw-tooth wave is less likely to follow a straight line than the early portion. In actual practice, it has been found desirable to employ a condenser discharge circuit having a frequency in the order of one-half the frequency of the rotor, as indicated in Figure 10 of the drawings. It is partly for this reason that a high firing voltage on the grid is employed. Another advantage of employing a saw-tooth generator whose natural frequency is substantially less than that at which the rotor will be balanced is that it enables the operator to bring the rotor up to balancing speed and then let it coast down for any desired period of time at progressively lowering speeds without interfering with the reading on the oscilloscope screen.

The circuit so far described thus produces a wave of saw-tooth form, as shown in solid lines in Figure 10. This curve is a series of straight line ascending wave forms followed by an almost instantaneous drop to zero or base voltage. This voltage wave is impressed upon the horizontal plates of the cathode ray tube and, consequently, has the effect of deflecting the spot formed on the screen at a uniform rate across the width of the screen once each revolution of the rotor, regardless of the rotor speed. This horizontal traverse will, because of its high frequency, appear as a straight horizontal line on the screen.

It is common practice to employ a saw-tooth generator of the type described in connection with cathode ray oscilloscopes, but, in accordance with the present invention, a single saw-tooth generator is used to control the horizontal frequency on both oscilloscopes. This is accomplished by connecting a pair of lines 175 and 176 across the condensers 154 and 156 through a suitable resistance 177. The lines 175 and 176 each contain a coupling condenser 178 and 179, respectively, and a resistance 180 and 181, respectively. A pair of leads 182 and 183 is connected across the resistance 180 and to the circuit for the horizontal plates of the oscilloscope 140, while a similar pair of leads 184 and 185 is connected across the resistance 181 and to the circuit of the horizontal plates of the oscilloscope 141. A third line 186 is also connected across the condensers 154 and 156 and contains a coupling condenser 187 and a resistance 188. A stroboscope light 189 is connected across the resistance 188 by a pair of lines 190 and 191. The stroboscope light unit includes a suitable transformer which, during the rapid falling portion of the saw-tooth wave, generates a sufficiently high voltage to light the neon lamp employed. Consequently, the lamp is lighted once each revolution of the rotor at the time the commutator contact points engage.

As shown in Figure 1, the stroboscope lamp unit 189 is placed on the base 20 in such a position that the rays from the lamp will shine upon one end of the rotor. Consequently, when the neon lamp is being lighted by the saw-tooth generator and the generator is operating properly, the rotor will appear to be standing still in the position shown in Figures 1 and 8. This gives a means of checking whether the commutator and saw-tooth generator are operating properly. The stroboscopic light unit also includes a switch, indicated diagrammatically at 193, by which it may be disconnected from the lines 190 and 191 and energized by a separate adjustable oscillating circuit of its own. By operating the handle 192 appearing in Figure 1, the natural frequency of the light may be altered at will and the light may thus be used to ascertain the speed of the rotor at any time.

As shown best in Figure 9, the vertical plates of each pair of oscilloscopes are energized by a separate amplifier 196, which is connected to a circuit including the pickup wire 85, lines 93 and 94, and a source of electrical energy 197. Line 93 contains an isolating resistance 198 and line 94 contains a coupling condenser 199. Each of the pickup circuits will produce a pulsating current wave whose amplitude at any given instant is proportional to the displacement of the corresponding rotor support in the plane of the strip 80. This, in turn, is directly proportional to the out-of-balance force acting in that plane at that end of the rotor. Consequently, the vertical plates of the oscilloscopes will be energized by a pulsating wave, which will deflect the otherwise horizontal line produced by the horizontal plates. The result in the usual case will be a sine wave, such as the sine waves depicted in Figure 9.

If the center of gravity of the rotor is located midway between the two planes in which the corrections are made and the circuits on the vertical plates of the two oscilloscopes are balanced, amplitude readings on the two screens will be to the same scale. If, however, the center of gravity is not located midway between the correction planes, the amplification provided by one or both of the amplifiers 196 may be adjusted to provide readings of equal scale. Once this relative adjustment is made, it need not be altered so long as rotors of one type are being balanced.

It will be noted that the oscilloscope screens are marked off by a series of vertical, equally spaced lines bearing the numbers 1 to 12. The location of the point of maximum deflection of the curve from the horizontal line indicates the angular location of the out-of-balance condition. Thus, on screen 143 the angular location of the point of unbalance at the right-hand end of the rotor is indicated as being at position 4. Consequently, the weight adjustment to correct the out-of-balance must be made at that position by removing screw No. 4 and replacing it with a heavier or lighter screw. The oscilloscopes are preferably so connected that when the curve goes above the horizontal line of the screen it indicates excessive weight in those regions, and, conversely, when the curve goes beneath the horizontal center line it indicates the point at which weight must be added. It has been found convenient to base all of the corrections upon readings taken above the horizontal center line, all of which readings then indicate weights which must be removed.

As previously indicated, the curve produced on one oscilloscope is partly the result of out-of-balance existing in the correction plane of the other oscilloscope. Therefore, direct readings of the amount of out-of-balance and its location are not given. However, it has been found that if all of the balancing is based upon the deflections of the curve above the horizontal center line and each correction is made first upon that end of the rotor which shows the greatest amplitude above the line, the rotor may be quickly balanced by cut and trial methods after the operator has had a little experience in operating the machine.

Figure 12:
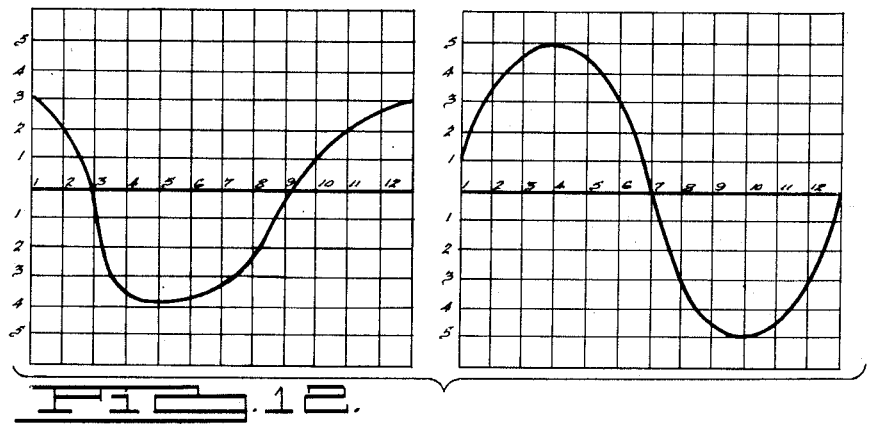
Figure 12 is a representative curve produced on the oscilloscope screens by an unbalanced rotor.
Figure 13:
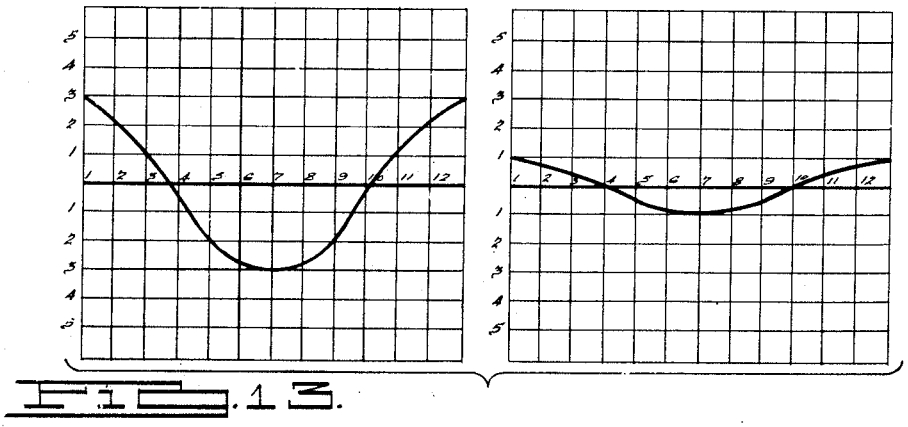
Figure 13 shows the shape of the curve after correction has been made at one correction plane.
Figure 14:
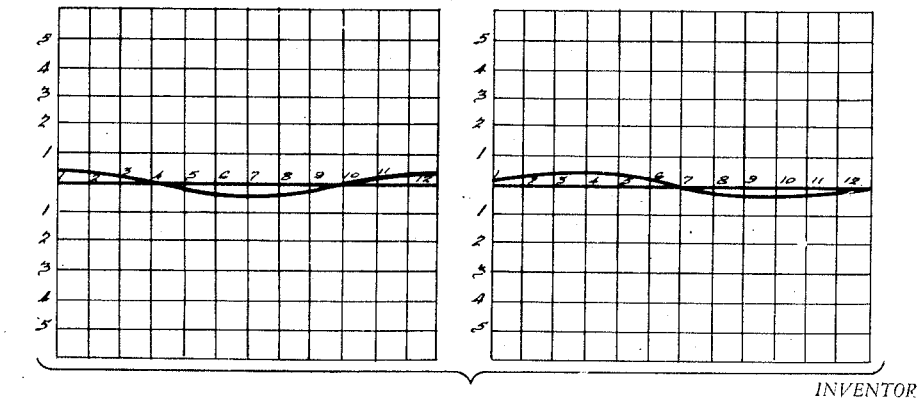
Figure 14 is a view of the curves after correction has been completed at both planes.

The procedure to be followed and the results upon the curves appearing on the oscilloscope screens are best illustrated in Figures 12 to 14.

Figure 12 shows a representative curve for a rotor which is out-of-balance. It will be observed that, considering only the portions of the curve above the horizontal center line, the maximum error appears to exist at the right-hand end of the rotor, and that at that end weight must be removed from position 4. The amplification of the vertical plate voltage on both oscilloscopes may be adjusted equally to obtain full scale readings. For example, a displacement of five units above the horizontal center line may indicate that approximately 100 milligrams must be removed from the right-hand end of the rotor at position 4. In that case, if that amount of correction is made, the two curves will then appear as shown in Figure 13, where it will be noted that the shape of the curve in the left-hand oscilloscope is somewhat changed, due to the correction at the right-hand end of the rotor. The maximum reading at the left-hand end is three units at position 1, indicating that at position 1, weight must be removed. If 60 milligrams are removed from position 1 on the left-hand end, then both curves appear as shown in Figure 14. The degree of balance indicated by Figure 14 may, depending upon the amplification adjustment, be sufficient for the given rotor. If, however, more accurate balance is required, the amplification may be increased equally on both pickups and the procedure repeated. The number of corrections which must be made for each rotor varies somewhat and is seldom as few as two corrections, two corrections being the minimum.

The procedure in taking each reading is first to bring the rotor up to the desired speed, which is determined by the stroboscopic light. The power is then turned off the induction coils 117 to 120 and the rotor allowed to coast freely while a reading is taken of the oscilloscopes. As soon as the operator determines by glancing at the oscilloscope screens which end requires correction first and the angular location and amount of correction required, the pole changer 125 is shifted, thus causing the coils 117 to 120 to bring the rotor to a stop to permit the necessary weight change. This procedure is repeated for each correction.

It is apparent that there is provided in accordance with the present invention a simple form of balancing machine which is effective to balance high speed rotors with great accuracy and with a minimum amount of time and effort. The machine is particularly adapted for use in mass production where the time required for performing balancing operations is critical. While only one embodiment of the invention is shown and described herein, it is apparent that others are available within the scope of the appended claims.

What is claimed is:

1. In a dynamic balancing machine, a stationary base, a support for a rotating body resiliently mounted on said base for limited movement in all directions relative to the base, and means independent of the resilient mounting for said support for measuring displacement of said support relative to said base in a given direction, including an electrically conductive wire extending in a stretched condition between the support and base in substantial alignment with the direction of the relative displacement to be measured whereby displacement of said support in said direction strains the wire and, consequently, varies its electrical resistance, the length of said wire being sufficiently in excess of the displacement of the support in said direction so that it will remain stretched at all times and sufficiently in excess of the displacement of the support in other directions so that displacements in other directions will have a negligible effect upon the strain of the wire.

2. In a dynamic balancing machine, a stationary base, a support for a rotating body resiliently mounted on said base for limited movement in all directions relative to the base, means independent of the resilient mounting for said support for measuring displacement of said support relative to said base in a given direction, including a strip of flexible sheet-like material connected at its ends to said support and base, respectively, and extending in the direction of the displacement to be measured, said strip being stretched by an amount exceeding the displacement to be measured, and a fine electrically conductive wire secured throughout its length to said strip and extending lengthwise thereof whereby displacement of said support in the direction to be measured strains the wire and, consequently, varies its electrical resistance, the length of the wire being sufficiently in excess of the displacement of the support in said direction so that it will remain stretched at all times and sufficiently in excess of displacements in other directions so that displacements in the other directions will have a negligible effect upon the strain of the wire.

JOHN A. TOLMAN.